United States Patent [19]

Murchison

[11] 3,926,803

[45] Dec. 16, 1975

[54] CYANIDE ENHANCEMENT OF THE PHOTOOXIDATION OF ACETIC ACID

[75] Inventor: Craig B. Murchison, Midland, Mich.

[73] Assignee: The Dow Chemical Company, Midland, Mich.

[22] Filed: Jan. 6, 1975

[21] Appl. No.: 538,696

[52] U.S. Cl............ 210/63; 204/157.1 R; 21/DIG. 2
[51] Int. Cl.$^2$............................................ C02B 3/08
[58] Field of Search............ 210/50, 59, 63, 64, 48; 204/157.1 R, 158 HA; 21/DIG. 2, 54 R, 59; 252/416, 420, 438

[56] References Cited

UNITED STATES PATENTS 3,819,516   6/1974   Murchison et al.................... 210/63
3,839,169   10/1974   Moyer.......................... 204/157.1 R Primary Examiner—Thomas G. Wyse
Assistant Examiner—Bendit Castel
Attorney, Agent, or Firm—Stephen R. Wright

[57] ABSTRACT

The ferric ion catalyzed photooxidation of acetic and other carboxylic acids in aqueous solutions, e.g. brines, is enhanced by addition thereto of a small but effective quantity of cyanide ions.

6 Claims, No Drawings

3,926,803

CYANIDE ENHANCEMENT OF THE PHOTOOXIDATION OF ACETIC ACID

BACKGROUND OF THE INVENTION

Numerous physical, biological and chemical processes have been developed for treating organically polluted aqueous liquors to reduce the chemical and biological oxygen demand thereof.

In biological processes, purification is effected through the agency of microorganisms, either bacteria or protozoa. The activated sludge process is exemplary of this group. In the activated sludge process an organically polluted aqueous liquor is held in a sedimentation basin while it is aerated to effect oxidation of the organic matter through the agency of microorganism. This process has several disadvantages, such as the long periods of time required and the poisoning of the microorganisms by constituents brought in by the aqueous liquor, e.g. halide ions, too great a concentration of phenols, etc. Also, there are problems associated with disposing of the sludge and the like.

Another class of technology involves catalytically promoted oxidation processes. U.S. Pat. Nos. 2,690,425; 2,962,421; 3,442,802 and German Pat. No. 10,990 are examples of these types of processes.

U.S. Pat. No. 3,819,516 to Murchison et al discloses a photolytic oxidation process for removing organic matter from aqueous solutions wherein ferric ions are utilized as a catalyst.

The present invention pertains to a method of further enhancing the ferric ion catalyzed photooxidation of carboxylic acids in an aqueous solution by adding thereto a catalytic quantity of cyanide ions.

SUMMARY OF THE INVENTION

To an aqueous solution containing one or more carboxylic acids and a catalytic quantity of ferric ions is added an amount of cyanide ions sufficient to provide a mole ratio of cyanide ions to ferric ions in said solution of at least about 5:1. The solution is maintained at pH of 4 or less, treated with $O_2$, and subjected to light waves ranging in length from about 2000 A to to 5800 A. As a result $CO_2$ is released and the total organic carbon (TOC) level of the solution is reduced.

DETAILED DESCRIPTION OF THE INVENTION

Aqueous solutions containing oxidizable carboxylic acids such as waste streams which come from chemical plants, distilleries, smelters, sewage systems and the like can be treated according to the practice of the present invention to oxidize the organics contained therein and correspondingly reduce the chemical, biochemical and total oxygen demand (COD, BOD and TOD) of the liquor. The process can be used in conjunction with other known waste treatment processes if desired. The process is more efficient when substantially all the reactants are dissolved in the aqueous liquor. However, some solid organics can be oxidized by the process of the invention.

Classes of organic materials the photooxidation of which is further catalyzed by the addition of cyanide ions include aliphatic and aromatic carboxylic acids, e.g. formic, acetic, propionic, 2,4-dichlorophenoxyacetic, chloropropionic, glycolic, chloroacetic, lactic, butyric acids and the like. Acetic acid is particularly beneficially oxidized by the present method, in that it is notoriously difficult to separate from aqueous solutions by other conventional methods, such as distillation.

The carboxylic acids can be present in amounts up to the saturation level in the aqueous liquor. The process can be carried out in such aqueous liquors as, for example, concentrated brines, e.g. chloride brines, and the like. The brine concentration is not critical, and a chloride ion concentration of 20% does not preclude the use of the method of the present invention.

As described more fully in U.S. Pat. No. 3,819,516, the disclosure of which is herein incorporated by reference, the aqueous solution containing a carboxylic acid is treated with a ferric ion source to provide a catalytic quantity of ferric ions therein, and is then continuously oxygenated while being subjected to light waves ranging in length from about 2000 A to about 5800 A. The pH of the solution should be about 4 or below during the oxidation of the organics present therein. Usually acids or acid producing materials such as HCl, $HNO_3$, $H_2SO_4$, $HClO_4$ can be employed to maintain the proper pH. A pH of from about 2 to about 3 is preferred.

It has now been discovered that the efficacy of the aforesaid process is enhanced by providing, additionally, cyanide ions in the solution containing the carboxylic acid to be oxidized.

The source of the cyanide ions is of no particular consequence, except that the cation along with which the cyanide is brought into the solution should not deleteriously affect photooxidation of the carboxylic acids contained in the solution, e.g. by itself forming a complex with such carboxylic acids. It has been found that a small concentration, e.g. on the order of 2 to 42 ppm, of cyanide ions is generally sufficient to further catalyze the ferric ion catalyzed photooxidation reaction.

However, it has been found to be important to choose the quantity of cyanide ions employed as a function of the quantity of ferric ions present. For example, with a mole ratio of cyanide ions to ferric ions of 2.7:1, the quantum yield (an indication of reaction rate in photooxidation reactions) of the photooxidation of acetic acid was improved by 13% over the quantum yield obtained when the photooxidation was conducted without cyanide ions present. On the other hand, with a mole ratio cyanide ion to ferric ion of 6:1, the quantum yield in the same reaction was improved by 97%. Reference to Example 1 may be had for the details of the tests conducted in making this determination. On the other hand, it has been found that increasing the mole ratio of cyanide ion to ferric ion beyond the vicinity of about 5-6:1 yields only a marginal increase in reaction rate; at a cyanide ion to ferric ion mole ratio of 60:1, only a slight improvement in quantum yield was obtained relative to that obtained with a cyanide to ferric ion mole ratio of 6:1.

A fundamental consideration when using cyanide ion in the method of the present invention is to insure that the concentration of ferric ion in the reaction solution is less than about 15 parts per million, to avoid the formation of the Prussian Blue complex, i.e. $Fe_2(CN)_6$. This compound is undesirable because it has a high extinction coefficient and is essentially nonphotoactive toward oxidation of organic compounds. Accordingly, a preferred concentration range for the ionic catalysts is from about 1 to about 15 ppm of ferric ions and from about 2 to about 42 ppm of cyanide ions. However, the precise concentrations of ferric and cyanide ions will depend to some degree on the natural extinction coefficient (transparency) or turbidity of the liquor to be treated, temperature conditions, quantity of oxygen utilized and the like.

The temperature of the solution containing the carboxylic acids to be oxidized is not critical. An appropriate temperature is that of the earth surface, permitting the present process to be carried out in an outdoor holding pond.

As indicated in U.S. Pat. No. 3,819,516 it is desirable to conduct the present photooxidation in acidic media of pH below about 4. Under these conditions, some free HCN is observed to form in the presence of light. The toxic properties of this compound are well-known, but the concentration of HCN formed by the use of this method on waste streams in a non-enclosed environment is considered to be so low as to be non-hazardous. Nevertheless, design of process systems utilizing the method of the present invention should take full account of the toxic properties of this particular by-product. Reference to published literature, e.g. Kruse and Thibault, *Analytical Chemistry* 45, 2260 (1973) shows that the release of cyanide from ferric cyanide solutions at a pH of 2, under room illumination, is about 0.1% per day based on the amount of cyanide originally present. Most of the cyanide, however, remains complexed with the iron and is removed from the solution when the iron is precipitated therefrom. Any residual $CN^-$ can be treated by standard methods to reduce cyanide levels to less than 10 ppb. (See, e.g. Zajic, *Water Pollution*, Vol. 2, page 14.)

By practicing all the parameters of the present invention the COD, BOD and TOD of an organically polluted aqueous liquor can be reduced. The products of the oxidation of the organics include volatile carbon containing compounds such as $CO_2$, $CO$, $CH_4$, as well as other water soluble and water insoluble materials. Solid products can be removed from the aqueous liquor by well-known methods of flocculation, precipitation, filtration and the like.

The following examples will facilitate a more complete understanding of the practice of the present invention.

EXAMPLE 1

In this test, various ligands were evaluated for the catalytic effect which they might contribute to the ferric ion catalyzed photooxidation of glycolic acid in a brine solution. To an 1800 milliliter volume of a 10% NaCl brine was added a sufficient amount of $FeCl_3 \cdot 6H_2O$ to provide a ferric ion concentratation therein of 10 parts per million (ppm). A 100 watt Hanovia mercury lamp was mounted in a pyrex light well, which in turn was immersed into the brine solution. The solution was thereby irradiated with wavelengths ranging from about 3000 to 4500 A. Various ligands were tested in various mole ratios of ligand to ferric ion concentration to ascertain their various efficacies. Among the various ligands tested were $CN^-$, $K_3Fe(CN)_6$, $F^-$, $NH_2CH_2CH_2NH_2$, $SO_4^=$, $SCN^-$, $P_2O_7^=$, and $OCN^-$. The results obtained are stated in the accompanying Table I.

Table I

| Ligand | Mole Ratio of Ligand to Ferric Ion | Initial Quantum Yield for Volatilization of Carbon |
|---|---|---|
| none | — | .044 |
| $Cn^-$ | 6 | .092 |

Table I-continued

| Ligand | Mole Ratio of Ligand to Ferric Ion | Initial Quantum Yield for Volatilization of Carbon |
|---|---|---|
| $CN^-$ | 60 | .104 |
| $K_3Fe(CN)_6$ | 6 | .099 |
| $CN^-$ | 2.7 | .050 |
| $F^-$ | 3 | .010 |
| $NH_2CH_2CH_2NH_2$ | 6 | .008 (20% NaCl) |
| $SO_4^=$ | 1.5 | .037 |
| $SCN^-$ | 6 | .011 |
| $SCN^-$ | .33 | .034 |
| $P_2O_7^=$ | 6 | .025 |
| $OCN^-$ | | unstable in acid |

EXAMPLE 2

In this example the effect of various concentrations and mole ratios of cyanide ion to ferric ion were evaluated. Into an 1800 milliliter solution of a 10% sodium chloride brine was added sufficient amount of a $FeCl_3 \cdot 6H_2O$ source to provide in said solution a ferric ion concentration of 10 ppm. The same light source used in Example 1 was used herein. Starting with various concentrations of acetic acid, various amounts of cyanide ion were added, and the disappearance of acetic acid was monitored. As can be seen from the data presented in Table II the most desirable results were obtained in the run in which 31 ppm $CN^-$ was employed in the presence of 10 ppm $Fe^{+3}$ ion, i.e. at a mole ratio of $CN^-$ to $Fe^{+3}$ of $\approx 6:1$. Adding a greater amount of $CN^-$, e.g. 300 ppm, (mole ratio of $\approx 60:1$) provided no further improvement. The results are summarized in the accompanying Table II.

Table II

| Time Min × $10^3$ | No $CN^-$ Conc. of acetic acid (ppm) | % Reduction in Conc. | 31 ppm $CN^-$ Conc. of acetic acid (ppm) | % Reduction in Conc. | 300 ppm $CN^-$ Conc. of acetic acid (ppm) | % Reduction in Conc. |
|---|---|---|---|---|---|---|
| 0 | 1800 | — | 1400 | — | 2000 | — |
| 1.3 | 1400 | 22 | 800 | 43 | 1250 | 37.5 |
| 2.7 | 1125 | 38 | 480 | 66 | 870 | 57 |
| 4.3 | 780 | 57 | 230 | 84 | — | — |
| 6.9 | 460 | 75 | 44 | 97 | — | — |

What is claimed is:

1. In a method of oxidizing carboxylic acids present in an aqueous solution of pH 4 or less by exposure to light waves ranging in length from about 2000 A to 5800 A in the presence of oxygen and a catalytic quantity of from about 1 to about 15 parts per million of ferric ions, whereby carbon dioxide is released and the total organic carbon of the solution is thereby reduced, the improvement which comprises: further catalyzing said oxidation by introducing into said solution a quantity of cyanide ions sufficient to provide, in said solution, a mole ratio of cyanide ions to ferric ions of at least about 5 to 1.

2. The method of claim 1 wherein the concentration of cyanide ions ranges between about 2 and 42 parts per million.

3. The method of claim 1 wherein the pH ranges from 2 to 3.

4. The method of claim 1 wherein the carboxylic acid is acetic acid.

5. The method of claim 1 wherein the aqueous solution is a brine.

6. The method of claim 5 wherein the brine contains chloride ions in a concentration ranging upward to about 20 weight percent.

* * * * *